(12) United States Patent
Ostrowski et al.

(10) Patent No.: US 7,186,867 B2
(45) Date of Patent: Mar. 6, 2007

(54) PROCESS FOR PREPARING REACTIVE POLYETHER POLYOLS HAVING AN ETHYLENE OXIDE END BLOCK

(75) Inventors: Thomas Ostrowski, Mannheim (DE); Raimund Ruppel, Dresden (DE); Gerd Höppner, Schwarzheide (DE); Sascha Bergmann, Neustadt/Sa. (DE); Koenraad Vandewalle, Oostmalle (BE); Eva Baum, Schwarzheide (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 174 days.

(21) Appl. No.: 10/828,967

(22) Filed: Apr. 21, 2004

(65) Prior Publication Data
US 2005/0240063 A1 Oct. 27, 2005

(51) Int. Cl.
*C07C 41/02* (2006.01)
(52) U.S. Cl. .................. 568/679; 568/620; 568/621
(58) Field of Classification Search ............... 568/620, 568/621, 679
See application file for complete search history.

(56) References Cited

U.S. PATENT DOCUMENTS 4,355,188 A * 10/1982 Herold et al. ............... 568/620
5,689,012 A * 11/1997 Pazos et al. ................ 568/619
7,005,552 B2 * 2/2006 Kaushiva .................... 568/620

FOREIGN PATENT DOCUMENTS

EP    0 750 001 B1    2/2001
WO    WO 97/29146    8/1997

* cited by examiner

*Primary Examiner*—Rosalynd Keys
(74) *Attorney, Agent, or Firm*—Fernando A. Borrego

(57) ABSTRACT

Process for preparing polyether polyols having an end block of ethylene oxide by addition of alkylene oxides onto H-functional starter substances, in which
A) a polyether polyol precursor is prepared by means of double metal cyanide (DMC) catalysis in a semicontinuous mode of operation in which previously prepared polyether polyol together with the DMC catalyst are placed in a reactor and H-functional starter substance and propylene oxide are added continuously,
B) the polyether polyol precursor from stage A) is reacted with propylene oxide or an ethylene oxide/propylene oxide mixture in the presence of the DMC catalyst in a continuously operating reactor to give a polyether polyol intermediate,
C) the intermediate from stage B) is mixed with an alkali metal hydroxide as catalyst and
D) reacted with ethylene oxide in a continuously operating reactor to give the final product,
E) the catalyst is separated off from the final product obtained in stage D).

20 Claims, No Drawings

PROCESS FOR PREPARING REACTIVE POLYETHER POLYOLS HAVING AN ETHYLENE OXIDE END BLOCK

The invention relates to a process for preparing reactive polyether polyols having an ethylene oxide end block.

Polyols for producing flexible polyurethane foams are divided into polyols for slabstock flexible foams and polyols for molded flexible foams. Both types of polyol are at present prepared using KOH technology. In this method, a starter, usually glycerol or trimethylolpropane (TMP), is placed in a reaction vessel, aqueous KOH is added and the mixture is dewatered. Alkylene oxides are subsequently metered in. In the case of polyols for slabstock flexible foams, it is usual to introduce a mixture of ethylene oxide (EO) and propylene oxide (PO), with the EO content being from 5 to 20%. Random copolymers having molar masses of from 2500 to 3500 g/mol are obtained. These products are used, for example, for producing foam mattresses. They have a low reactivity since they contain predominantly secondary alcohol functions derived from propylene oxide.

In contrast, molded flexible foam polyols are generally block copolymers which have an internal block of propylene oxide or a random mixture of ethylene oxide and propylene oxide, with the internal block making up the major part of the molecular weight, and an end block of ethylene oxide. These reactive polyols have predominantly primary alcohol functions derived from ethylene oxide. At an EO content of 15%, a proportion of primary OH groups of from 70 to 90% is achieved. The molar masses of this type of polyol are in the range from 4000 to 6000 g/mol.

Double metal cyanide complexes are highly active catalysts for preparing polyether polyols by means of alkylene oxide polymerization. The catalysts make it possible to prepare polyether polyols having a narrow molecular weight distribution and very low unsaturation (very low monool contents), even at high molecular weights.

In the preparation of polyether polyols using the DMC technology, it is usual to prepare a precursor using the feed stream process. In this, propylene oxide is metered in in parallel with glycerol or another starter substance. The joint introduction of propylene oxide and starter substance prevents the starter substance from acting as a catalyst poison. Such a process is described, for example, in WO97/29146.

It is also possible to react mixtures of ethylene oxide and propylene oxide over a DMC catalyst. Here, mixtures containing up to 20% of ethylene oxide can be processed without problems. However, the DMC catalysts available do not allow ethylene oxide to be reacted alone, for example in order to produce polyether polyols having a pure ethylene oxide end block. Although ethylene oxide reacts, turbid products having a low content of primary OH groups are always obtained.

Accordingly, it is not possible to prepare polyether polyols having an ethylene oxide end block directly using DMC catalysts. The usual way of preparing EO end block polyether polyols therefore comprises a DMC-catalyzed first stage in which a polyoxypropylene polyol or a random EO-PO copolymer is prepared and a KOH-catalyzed second stage in which KOH is added and the DMC catalyst is thereby deactivated. A reaction with pure ethylene oxide is subsequently carried out.

EP-A 0 750 001 discloses a process for preparing ethylene oxide end block polyether polyols in which a first polyether polyol which has been prepared by means of DMC catalysis and contains active DMC catalyst is mixed with a second polyether polyol which has been prepared by means of base catalysis and contains the basic catalyst and the mixture is reacted with ethylene oxide to give the EO end block polyether polyol. For example, after the DMC-catalyzed propoxylation of the starter substance, a KOH-catalyzed, alkaline propoxylate is added and ethylene oxide is subsequently metered in. However, the advantages of the DMC-catalyzed propoxylation, e.g. low unsaturation and high reaction rates, are only partly exploited since part of the propoxylate is prepared by means of base catalysis.

It is an object of the invention to provide a process which is simple to carry out and can be used to prepare reactive polyether polyols which have an end block of ethylene oxide.

This object is achieved by a process for preparing polyether polyols having an end block of ethylene oxide by addition of alkylene oxides onto H-functional starter substances, in which A) a polyether polyol precursor is prepared by means of double metal cyanide (DMC) catalysis in a semicontinuous mode of operation in which previously prepared polyether polyol together with the DMC catalyst are placed in a reactor and H-functional starter substance and propylene oxide are added continuously, B) the polyether polyol precursor from stage A) is reacted with propylene oxide or an ethylene oxide/propylene oxide mixture in the presence of the DMC catalyst in a continuously operating reactor to give a polyether polyol intermediate, C) the intermediate from stage B) is mixed with an alkali metal hydroxide as catalyst and the water of reaction is removed, D) the intermediate is reacted with ethylene oxide in a continuously operating reactor to give the final product, E) the catalyst is separated off from the final product obtained in stage D).

As a result of the continuous procedure, only small apparatuses are required, so that the capital costs are lower than for a batch process. The polyether polyols prepared in this way have a particularly low proportion of high molecular weight constituents. Furthermore, the continuous procedure ensures a high and constant product quality. As a result of the DMC catalysis, the polyether polyol precursor and the polyether polyol intermediate have a high functionality which corresponds to the functionality of the starter substance.

Furthermore, the process of the invention ensures a high degree of safety. No gas phase is formed in the continuously operating ethoxylation reactor of stage D), so that gas-phase decomposition of the ethylene oxide is ruled out. The use of DMC catalysts in stages A) and B) and of alkali metal hydroxide in stage D) achieves high reaction rates. The steady-state alkylene oxide concentration is therefore low, thus ensuring safe operation of the entire plant.

In stage A), a polyether polyol precursor is prepared by means of DMC catalysis in a semicontinuous mode of operation. For this purpose, previously prepared polyether polyol precursor is placed in a reactor. The polyether polyol precursor can have been prepared via the conventional process using KOH catalysis. The polyether polyol precursor can originate from a previous production cycle and have been prepared by means of DMC catalysis. In general, from 5 to 20% by weight of the amount of polyether polyol precursor prepared in stage A) are initially placed in the reactor.

The polyether polyol precursor generally has an OH number of from 50 to 400 mg KOH/g and a mean molecular weight of from 500 to 3000 g/mol.

Suitable H-functional starter substances are all compounds which have an active hydrogen. According to the invention, preference is given to OH-functional compounds as starter compounds.

Suitable starter compounds are, for example, the following compounds: water, organic dicarboxylic acids such as succinic acid, adipic acid, phthalic acid and terephthalic acid, and also monohydric or polyhydric alcohols such as monoethylene glycol, 1,2- and 1,3-propanediol, diethylene glycol, dipropylene glycol, 1,4-butanediol, 1,6-hexanediol, glycerol, trimethylolpropane, pentaerythritol, sorbitol and sucrose. Preferred H-functional starter compounds are water, monoethylene glycol, diethylene glycol, 1,2-propanediol, dipropylene glycol, glycerol, trimethylolpropane, triethanolamine, pentaerythritol, sorbitol and/or sucrose, which can also be used as mixtures.

The mean functionality of the starter or the starter mixture is generally from 2 to 4, preferably from 2.2 to 3.0.

A preferred starter compound is glycerol. In one variant of the process of the invention, glycerol is used in admixture with a costarter selected from among sorbitol, dipropylene glycol, propanediol, ethylene glycol and diethylene glycol.

The H-functional starter substance and propylene oxide are added continuously to the initial charge of polyether polyol precursor and DMC catalyst. The H-functional starter substance and propylene glycol can be added as a mixture or via separate feed streams. The starter substance can be added over the entire duration of the propylene oxide addition or for only part of this time. For example, it is possible for the starter substance to be added only at the beginning of the propylene oxide addition and pure propylene oxide to be added subsequently. The addition times for starter substance and propylene oxide are generally in the range from 60 to 600 minutes.

The preparation of the polyether polyol precursor can be carried out in an inert solvent. Suitable inert solvents are benzene, toluene, hexane, heptane and octane. The preparation is generally carried out at a temperature of from 100 to 140° C. and a pressure of from 2 to 10 bar absolute.

A polyether polyol precursor which generally has from 10 to 80%, preferably from 15 to 60%, of the molar mass of the final product is obtained.

As DMC compound, it is in principle possible to use all suitable compounds known to those skilled in the art.

DMC compounds suitable as catalyst are described, for example, in WO 99/16775, EP 862 947 and DE 10117273.7. Particularly suitable catalysts for the alkoxylation are double metal cyanide compounds of the formula I:

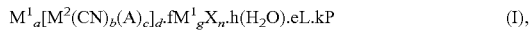

$$M^1_a[M^2(CN)_b(A)_c]_d \cdot fM^1_g X_n \cdot h(H_2O) \cdot eL \cdot kP \qquad (I),$$

where $M^1$ is at least one metal ion selected from the group consisting of $Zn^{2+}$, $Fe^{2+}$, $Fe^{3+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Ce^{4+}$, $Eu^{3+}$, $Ti^{3+}$, $Ti^{4+}$, $Ag^+$, $Rh^{2+}$, $Rh^{3+}$, $Ru^{2+}$, $Ru^{3+}$, $M^2$ is at least one metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$, A and X are each, independently of one another, an anion selected from the group consisting of halide, hydroxide, sulfate, carbonate, cyanide, thiocyanate, isocyanate, cyanate, carboxylate, oxalate, nitrate, nitrosyl, hydrogensulfate, phosphate, dihydrogen phosphate, hydrogen phosphate and hydrogen carbonate, L is a water-miscible ligand selected from the group consisting of alcohols, aldehydes, ketones, ethers, polyethers, esters, polyesters, polycarbonate, ureas, amides, primary, secondary and tertiary amines, ligands having pyridin nitrogen, nitriles, sulfides, phosphides, phosphites, phosphanes, phosphonates and phosphates, k is a fraction or integer greater than or equal to 0, and P is an organic additive, a, b, c, d, g and n are selected so that the compound (I) is electrically neutral, with c being able to be 0, the number e of ligand molecules is a fraction or integer greater than 0 or is 0, f, h and m are each, independently of one another, a fraction or integer greater than 0 or 0.

Organic additives P which may be mentioned are: polyethers, polyesters, polycarbonates, polyalkylene glycol sorbitan esters, polyalkylene glycol glycidyl ethers, polyacrylamide, poly(acrylamide-co-acrylic acid), polyacrylic acid, poly-(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride copolymers, hydroxyethylcellulose, polyacetates, ionic surface-active and interface-active compounds, bile acids or their salts, esters or amides, carboxylic esters of polyhydric alcohols and glycosides.

These catalysts can be crystalline or amorphous. When k is 0, crystalline double metal cyanide compounds are preferred. When k is greater than 0, both crystalline, partially crystalline and substantially amorphous catalysts are preferred.

Among the modified catalysts, there are various preferred embodiments. Catalysts of the formula (I) in which k is greater than 0 constitute one preferred embodiment. The preferred catalyst then comprises at least one double metal cyanide compound, at least one organic ligand and at least one organic additive P.

In another preferred embodiment, k is 0, e may optionally also be 0 and X is exclusively a carboxylate, preferably formate, acetate and propionate. Such catalysts are described in WO 99/16775. In this embodiment, crystalline double metal cyanide catalysts are preferred. Preference is also given to double metal cyanide catalysts as described in WO 00/74845 which are crystalline and in the form of platelets.

The modified catalysts are prepared by combining a metal salt solution with a cyanometalate solution which may optionally further comprise an organic ligand L and an organic additive P. The organic ligand and optionally the organic additive are subsequently added. In a preferred embodiment of the catalyst preparation, an inactive double metal cyanide phase is prepared first and this is subsequently converted by recrystallization into an active double metal cyanide phase, as described in PCT/EP01/01893.

In another preferred embodiment of the catalysts, f, e and k are not equal to zero. These catalysts are double metal cyanide catalysts containing a water-miscible organic ligand (generally in amounts of from 0.5 to 30% by weight) and an organic additive (generally in amounts of from 5 to 80% by weight), as described in WO 98/06312. The catalysts can be prepared either with intensive stirring (24 000 rpm by means of a Turrax) or with stirring, as described in U.S. Pat. No. 5,158,922.

Particularly useful catalysts for the alkoxylation are double metal cyanide compounds comprising zinc, cobalt or iron or two of these. An example of a particularly suitable compound is Berlin blue.

Preference is given to using crystalline DMC compounds. In a preferred embodiment, a crystalline DMC compound of the Zn—Co type containing zinc acetate as further metal salt component is used as catalyst. Such compounds crystallize in a monoclinic structure and have a platelet-like habit. Such compounds are described, for example, in WO 00/74845 or PCT/EP01/01893.

DMC compounds suitable as catalyst can in principle be prepared by all methods known to those skilled in the art. For example, the DMC compounds can be prepared by direct precipitation, by the "incipient wetness" method, by preparation of a precursor phase and subsequent recrystallization.

The DMC compounds can be used as powder, paste or suspension or can be shaped to produce a shaped body, incorporated in shaped bodies, foams or the like or applied to shaped bodies, foams or the like.

The catalyst concentration used for the alkoxylation, based on the final quantities, is typically less than 2000 ppm, preferably less than 1000 ppm, in particular less than 500 ppm, particularly preferably less than 100 ppm, for example less than 50 ppm.

In a stage B) following stage A), the polyether polyol precursor is reacted with propylene oxide or an ethylene oxide/propylene oxide mixture in the presence of the DMC catalyst in a continuously operating reactor to give a polyether polyol intermediate. Suitable continuously operating reactors are, for example, a continuously operated stirred tank reactor (CSTR), a continuously operated jet loop reactor having internal heat exchanger tubes and a continuously operated, completely filled circulation reactor.

In one variant of the process of the invention, stage B) is carried out in a continuously operated stirred tank reactor, for example as described in WO 98/03571.

In a further variant of the process of the invention, stage B) is carried out in a continuously operated jet loop reactor having internal heat exchanger tubes. Such a reactor is described, for example, in WO 01/62826.

In a further variant of the process of the invention, stage B) is carried out in a continuously operated, completely filled flow tube. Such a reactor is described, for example, in DD 203 735.

The alkoxylation is generally carried out at a temperature of from 80 to 180° C. and a pressure of from 1 to 20 bar absolute.

Stage B) gives a polyether polyol intermediate which generally has from 50 to 95%, preferably from 60 to 90%, of the molar mass of the final product. The polyether polyol intermediate has an KOH number of from 28 to 60 mg KOH/g and a mean molar mass of from 3000 to 6000 g/mol.

The polyether polyol intermediate is preferably then freed of unreacted alkylene oxide. For this purpose, it is degassed at a temperature of generally from 100 to 150° C. and a pressure of generally from 10 to 100 mbar in one or more degassing vessels connected in series for a period of generally from 0.5 to 4 hours.

The polyether polyol intermediate from stage B) is subsequently mixed with an alkali metal hydroxide. Preferred alkali metal hydroxides are KOH and NaOH, with particular preference being given to NaOH. The alkali metal hydroxide is preferably introduced as an aqueous alkali metal hydroxide solution. The water introduced with the aqueous solution and the water of reaction from alkoxide formation are separated off by distillation. The temperature in this dewatering step is, for example, from 100 to 150° C. and the pressure is, for example, from 10 to 100 mbar. This dewatering step preferably reduces the water content of the polyether intermediate to less than 0.02% by weight. Dewatering is carried out, for example, in a vessel, a column or a falling film evaporator. The addition of alkali metal hydroxide deactivates the DMC catalyst. Prior removal of the DMC catalyst is not necessary.

The polyether polyol intermediate is subsequently reacted with ethylene oxide in a stage D) in a continuously operating reactor to form the final product. The reaction is preferably carried out in a tube reactor having a plurality of points for introduction of ethylene oxide. The temperature is generally from 100 to 180° C. and the pressure is generally from 4 to 20 bar. The ethylene oxide concentration in the polyether polyol in the ethoxylation is preferably $\leq 5\%$ by weight. The distributed introduction of ethylene oxide ensures a low ethylene oxide concentration in the polyether polyol. Furthermore, a low degree of heating at the point of introduction is ensured. Suitable reactors are tube reactors or shell-and-tube reactors. It is also possible to employ the reactors described in DE 100 54 462.

In a stage E), the catalyst is separated off from the final product obtained in stage D).

For this purpose, it is possible to use all known methods for catalyst removal, for example crystallization of the catalyst by addition of phosphoric acid, hydrochloric acid or sulfuric acid, adsorption on aluminosilicates or by means of the water wash process as described, for example, in U.S. Pat. No. 3,715,402. The catalyst removal can be carried out, for example, as described in U.S. Pat. No. 4,482,750. Here, from 1 to 20% by weight of water and from 0 to 30% by weight of an inert organic solvent are added to the alkaline polyether polyol. The emulsion obtained is left to stand at at least 70° C. for a period of at least 30 minutes to bring about separation of the emulsion into an organic phase and an aqueous phase. The aqueous phase is subsequently separated off from the organic phase. The catalyst removal is preferably carried out by means of a process in which no solid is obtained. For example, processes using solvents and centrifuges for separating polyol and aqueous phases, as described, for example, in DE-A 3 016 113, can be employed. Owing to the continuous mode of operation in the ethoxylation stage D), continuously operating processes are also preferred for the catalyst removal. In a preferred variant of the process of the invention, phase separation is effected by use of coalescers. Suitable processes are described, for example, in WO 96/20972, WO 01/14456 and U.S. Pat. No. 4,482,750.

The polyol phase can be freed of volatile by-products by vacuum stripping, steam or nitrogen stripping under reduced pressure, atmospheric pressure or super-atmospheric pressure in a subsequent deodorization step.

The polyols prepared according to the invention are used, in particular, for producing molded flexible foams.

The invention is illustrated by the following examples.

EXAMPLE 1

Preparation of the Polyol Precursor ("VP1485") by Means of KOH Catalysis 1.15 kg of glycerol are placed in a pressure-rated reactor having a capacity of 28 l and 0.0562 kg of solid KOH are added. After the reactor has been made inert by means of nitrogen, the reaction mixture is heated to 120° C. and the water of reaction is distilled off at a pressure of <10 mbar absolute over a period of 3 hours. The vacuum is broken by admission of N$_2$ and the pressure in the reactor is set to 1 bar absolute. 17.59 kg of PO are subsequently metered in at 120° C. over a period of 4 hours. After the end of the addition, the mixture is allowed to react for a further 4 hours until the pressure in the reactor remains constant. 5% of Macrosorb and 2% of water (in each case based on the mass of the reaction mixture) are added to the reaction mixture, and the suspension obtained is stirred at 90° C. for about 2 hours.

Water is subsequently distilled off at 100° C. and 1 mbar absolute and the product is filtered off to remove the solid. The product has a water content of 0.016% by weight and an OH number of 112.6 mg KOH/g. The residual potassium content is below 2 ppm, and the acid number is 0.002 mg KOH/g.

EXAMPLE 2

Preparation of a Polyether Triol Having an Ethylene Oxide End Block of 10% by Weight Preparation of the Polyol Precursor 0.0625 kg of DMC catalyst prepared as described in example 1 of EP-B 0 862 947 is added as a moist filter cake to 25 kg of the polyether polyol precursor from example 1. The mixture is subsequently dried under reduced pressure to reduce the water content to values below 250 ppm. 13.88 kg of glycerol and 211.13 kg of PO are subsequently metered in simultaneously over a period of 4 hours. The reactor temperature is 130° C. This gives a product having an OH number of 114.2 mg KOH/g. The product will hereinafter be referred to as "VP1485".

Continuous Propoxylation of the Polyol Precursor

A continuously operated stirred tank reactor (CSTR) having a volume of 1.25 l is charged with 500 ml of VP1485. The CSTR is operated at 2 bar absolute and 130° C., and the residence time is 60 minutes. The fill level is monitored by means of two temperature sensors which are located at different heights. An ATR-IR sensor is inserted into the reactor from above in order to monitor the PO concentration. VP 1485 is metered into the reactor. After a fill level of 1 l has been reached, PO is additionally metered in and the reactor output is opened. 0.3 kg/h of VP1485 and 0.699 kg/h of PO are metered in by means of gear pumps. The product is conveyed into a first degassing vessel, which is operated batchwise, and degassed at 130° C. and 10 mbar absolute. After 12 hours, 10 l of the product are conveyed to a second degassing vessel and degassed further for about 1 hour at 130° C. and 10 mbar absolute. This gives an intermediate having an OH number of 34.2 mg KOH/g and a molar mass of 4950 g/mol.

Ethoxylation of the Polyol Intermediate 20 kg of this intermediate are placed in a 25 l reactor, admixed with 0.092 kg of KOH in the form of a 48% strength by weight solution and the water of reaction is removed by distillation at 120° C. and 10 mbar absolute. The dewatered alkaline intermediate is subsequently ethoxylated.

The ethoxylation reactor comprises a 25 m long stainless steel tube which has an internal diameter of 3 mm and is wound into a spiral and immersed in a drum containing water at 50° C. The alkaline product is fed into the coiled tube at 90° C. by means of a gear pump. About 10 cm downstream of the feed point, there is a first EO introduction point and a second EO introduction point is located about 5 m downstream of the feed point. The reactor is operated at a pressure of about 20 bar absolute. 1 kg/h of intermediate is metered in. After the reactor is full, 50 g/h of EO are metered in at each of the two EO introduction points. At the end of the coiled tube, the product is degassed in the above-described degassing system comprising two degassing vessels.

Catalyst Removal

The catalyst is subsequently removed by adding 3% by weight of water and 5% by weight of Ambosol Macrosorb MP-5 plus from Crosfield, Eijden, Holland, to the product in a stirred vessel, stirring the mixture for 1 hour and distilling off the water at 100° C. and 10 mbar absolute. The solid is separated off by means of Seitz deep bed filters.

The final product obtained has an OH number of 31.1 mg KOH/g, and the polydispersity index $M_w/M_n$ of the product is 1.32. The primary OH group content of the product is 69 mol %, determined by means of NMR.

EXAMPLE 3

Preparation of a Polyether Triol Having an Ethylene Oxide End Block of 5% by Weight The preparation is carried out by a method analogous to example 2. VP1485 is used as starting material. However, the proportion of PO in the continuous propoxylation of the polyol precursor is increased in order to obtain a higher degree of propoxylation. 0.285 kg/h of VP1485 and 0.715 kg/h of PO are metered into the CSTR. Residence time, reaction temperature and pressure are kept constant. After degassing, an intermediate having an OH number of 32.0 mg KOH/g is obtained. The molar mass of this intermediate is 5260 g/mol.

The intermediate is ethoxylated as in example 2, but 50 g/h of ethylene oxide is metered in only at the first introduction point on the tube reactor.

The work-up is likewise carried out as described in example 2.

This gives a product having an OH number of 30.72 mg KOH/g. The primary OH group content is 43%.

The invention claimed is:

1. A process for preparing polyether polyols having an end block of ethylene oxide by addition of alkylene oxides onto H-functional starter substances, in which
   A) a polyether polyol precursor is prepared by means of double metal cyanide (DMC) catalysis in a semicontinuous mode of operation in which previously prepared polyether polyol together with the DMC catalyst are placed in a reactor and H-functional starter substance and propylene oxide are added continuously,
   B) the polyether polyol precursor from stage A) is reacted with propylene oxide or an ethylene oxide/propylene oxide mixture in the presence of the DMC catalyst in a continuously operating reactor to give a polyether polyol intermediate,
   C) the intermediate from stage B) is mixed with an alkali metal hydroxide as catalyst and
   D) reacted with ethylene oxide in a continuously operating reactor to give the final product,
   E) the catalyst is separated off from the final product obtained in stage D).

2. A process according to claim 1, wherein the polyether polyol precursor prepared in stage A) has from 10 to 80% of the molar mass of the final product.

3. A process according to claim 1 or 2, wherein the polyether polyol precursor prepared in stage A) has an OH number of from 50 to 400 mg KOH/g.

4. A process according to claim 1, wherein the polyether polyol intermediate prepared in stage B) has from 50 to 95% of the molar mass of the final product.

5. A process according to claim 1, wherein stage B) is carried out in a continuously operated stirred tank reactor (CSTR).

6. A process according to claim 1, wherein stage B) is carried out in a continuously operated jet loop reactor having internal heat exchanger tubes.

7. A process according to claim 1, wherein stage B) is carried out in a continuously operated, completely filled circulation reactor.

8. A process according to claim 1, wherein the catalyst suitable for ethoxylation is selected from among KOH, amines and Lewis acids.

9. A process according to claim 8, wherein the catalyst is separated off from the final product in stage E) by adding water to the reaction mixture obtained in stage D and effecting phase separation in a coalescer.

10. A process according to claim 2, wherein the polyether polyol intermediate prepared in stage B) has from 50 to 95% of the molar mass of the final product.

11. A process according to claim 3, wherein the polyether polyol intermediate prepared in stage B) has from 50 to 95% of the molar mass of the final product.

12. A process according to claim 4, wherein stage B) is carried out in a continuously operated stuffed tank reactor (CSTR).

13. A process according to claim 2, wherein stage B) is carried out in a continuously operated jet loop reactor having internal heat exchanger tubes.

14. A process according to claim 3, wherein stage B) is carried out in a continuously operated jet loop reactor having internal heat exchanger tubes.

15. A process according to claim 4, wherein stage B) is carried out in a continuously operated jet loop reactor having internal heat exchanger tubes.

16. A process according to claim 2, wherein stage B) is carried out in a continuously operated, completely filled circulation reactor.

17. A process according to claim 3, wherein stage B) is carried out in a continuously operated, completely filled circulation reactor.

18. A process according to claim 4, wherein stage B) is carried out in a continuously operated, completely filled circulation reactor.

19. A process according to claim 10, wherein stage B) is carried out in a reactor selected from the group of a continuously operated jet loop reactor having internal heat exchanger tubes and a completely filled circulation reactor.

20. A process according to claim 11, wherein stage B) is carried out in a reactor selected from the group of a continuously operated jet loop reactor having internal heat exchanger tubes and a completely filled circulation reactor.

* * * * *